United States Patent
Dreisin

[11] 3,859,970
[45] Jan. 14, 1975

[54] ENGINE RETARDER BRAKE
[75] Inventor: Alexander Dreisin, Oylmpia Fields, Ill.
[73] Assignee: Allis-Chalmers Corporation, Milwaukee, Wis.
[22] Filed: Jan. 22, 1973
[21] Appl. No.: 325,958

[52] U.S. Cl. ............................ 123/97 B, 123/90.12
[51] Int. Cl. .......................... F01l 9/02, F02d 13/04
[58] Field of Search ............... 123/97 B, 182, 90.12

[56] References Cited
UNITED STATES PATENTS
| | | | |
|---|---|---|---|
| 2,002,196 | 5/1935 | Ucko | 123/97 B |
| 2,030,247 | 2/1936 | Dilworth | 123/90.12 X |
| 2,595,775 | 5/1952 | Wrangell | 123/90.12 |
| 3,220,392 | 11/1965 | Cummins | 123/97 B |
| 3,405,699 | 10/1968 | Laas | 123/97 B |

FOREIGN PATENTS OR APPLICATIONS
| | | | |
|---|---|---|---|
| 457,196 | 3/1928 | Germany | 123/97 B |
| 1,057,385 | 3/1958 | Germany | 123/97 B |

Primary Examiner—Charles J. Myhre
Assistant Examiner—W. Rutledge
Attorney, Agent, or Firm—Arthur L. Nelson

[57] ABSTRACT

An engine retarder brake including a cam operated hydraulic actuator for operating a valve in the combustion chamber near the end of the compression stroke to discharge compressed air and operate the engine as a brake for the vehicle.

10 Claims, 7 Drawing Figures

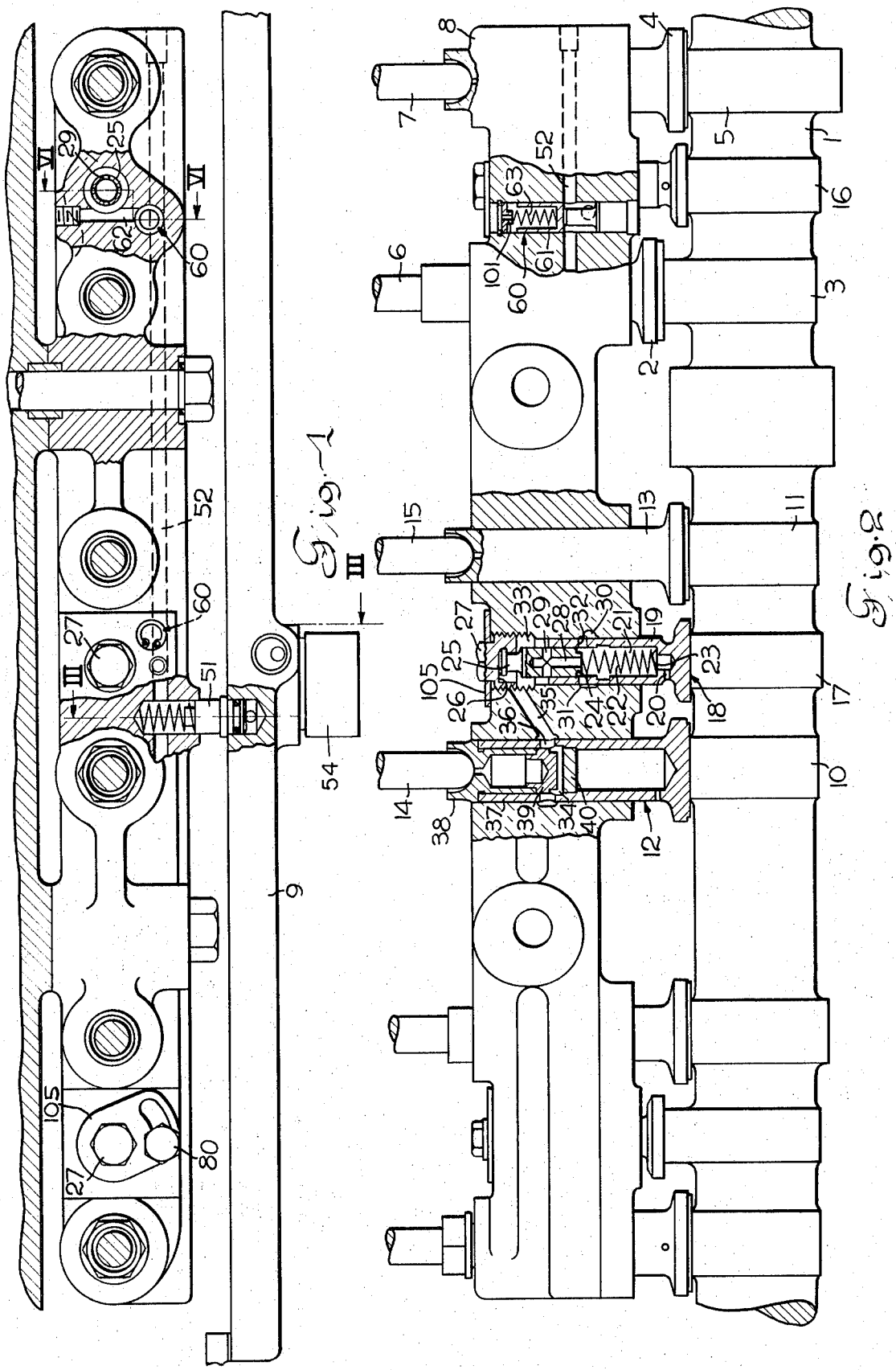

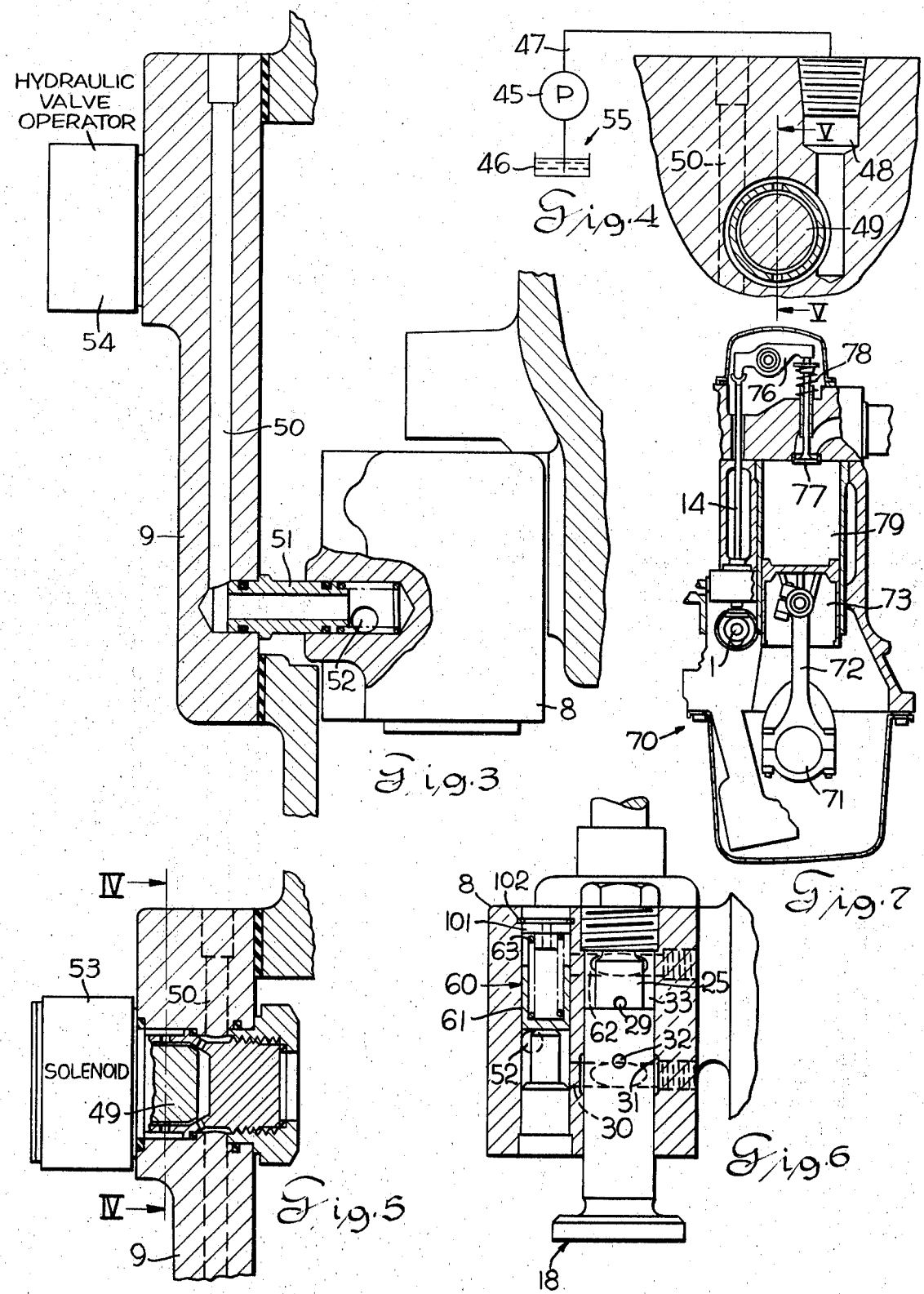

ENGINE RETARDER BRAKE

This invention relates to an internal combustion engine operating as an air compressor and more particularly to a cam operated hydraulic pump operating a hydraulic actuator to open a valve in the combustion chamber near the end of the compression stroke to release the stored energy in the compressed air and cause the engine to operate as an air compressor instead of an engine.

Internal combustion engines are used extensively as a power plant in cargo carrying vehicles such as trucks on the highway. Trucks and buses on the highway have increased in size and the speed of these vehicles has also increased substantially over the years. The increase in size and speed of the heavy transport vehicles has also drastically increased their kinetic energy when in operation and likewise the braking effort required to slow these vehicles down particularly on long hills and in mountainous areas. While the brakes on the vehicles have also improved and have increased in size, there is a practical limit to the amount of braking effort which can be exerted in controlling the speed of the vehicle since the heat generated must be dissipated to the atmosphere. There are several hazards such as brake fade, caused by continuous use of the brakes until the brakes overheat and lose their braking ability which leaves the operator of the vehicle with no braking control on the vehicle. Overheating of the brakes may be increased to the point that a fire may even result which creates a danger to the vehicle and even the cargo itself. Accordingly, some other means for braking the vehicle must be devised which will provide the operator with braking control. This control is necessary not only in the event of brake failure, such as loss of air, brake fade or overheating and so on, but as a means of dissipating the stored energy of the rolling vehicle through some other means and thereby save the brakes for the emergency stops so that the operator has complete control of the vehicle at all times.

Any internal combustion engine installed in the vehicle acts as a brake when the fuel supply is shut off since it absorbs a certain amount of energy due to its internal friction and the pumping losses and thereby slows down the vehicle. However, this retarding action can be substantially increased by changing the engine operating cycle which transforms the engine into an air compressor. When a piston in a given engine cylinder nears the end of its compression stroke, whether it be a four-stroke or two-stroke engine, one of the engine valves is opened and the compressed air is released into the manifold. Subsequently, the valve is closed again during the expansion stroke and the rest of the engine cycle remains unchanged. In this manner, the work of compressing the air absorbs kinetic energy of the vehicle slowing it down, and releasing the compressed air at the top of the compression stroke prevents the engine from returning the stored up energy to the vehicle during the expansion stroke.

It is an object of this invention to operate an internal combustion engine as a vehicle brake.

It is another object of this invention to operate an internal combustion engine as an air compressor through a hydraulic means for changing the time of opening of one of the valves in the combustion chamber.

It is a further object of this invention to selectively operate the engine normally used for driving the vehicle as an air compressor to provide a retarding force for braking of the vehicle.

It is a further object of this invention to provide in an internal combustion engine hydraulic means to open an exhaust valve near the end of the compression stroke to operate the engine as an energy absorbing means for braking the vehicle.

The objects of this invention are accomplished by connecting the lubricating oil system through oil passages to a hydraulic pump. The hydraulic pump is operated by an auxiliary cam on the cam shaft. When it is desired, a valve selectively connects the lubricating oil system to the hydraulic pump and the pump pressurizes fluid in response to rotation of the cam shaft. The auxiliary hydraulic pump is connected through passage means to a hydraulic actuator in the valve lift mechanism of the exhaust valve. As an auxiliary hydraulic pump pressurizes fluid it is transmitted to the hydraulic actuator in the valve lift mechanism of the exhaust valve to open the exhaust valve near the end of the compression stroke. In this manner, the compressed air and the kinetic energy stored in the compressed air of the cylinder is released through the exhaust manifold and the stored energy is not returned to the engine. Accordingly, the engine operates as an air compressor since at the time of opening the valve between the hydraulic lubricating oil system to the auxiliary hydraulic pump the fuel to the engine is also shut off. Operating the engine as a compressor releases energy in the compressed air which is then dissipated when it is released from the exhaust manifold. This in turn through the vehicle drive mechanism operates as a brake for the vehicle and overcomes the need for dissipating the kinetic energy of the rolling vehicle through the braking system.

FIG. 1 is a cross section view showing components of the engine in the cam follower bracket as well as a portion of the auxiliary hydraulic pump.

FIG. 2 is a cross section view showing a fragmentary section cut through the intake and exhaust valve tappets and showing the auxiliary hydraulic pump.

FIG. 3 is a cross section view showing the hydraulic connections from the lubricating oil system through the hydraulic passages to the auxiliary hydraulic pump taken on line III—III of FIG. 1.

FIG. 4 is a cross section view taken on line IV—IV of FIG. 5.

FIG. 5 is a cross section view taken on line V—V of FIG. 4.

FIG. 6 is a cross section view taken on line VI—VI of FIG. 1 showing the auxiliary hydraulic pump and a relief valve connected to the pressurizing chamber.

FIG. 7 is a reduced section view of an internal combustion engine.

Referring to FIGS. 1 and 2 a part of the engine cam shaft 1 is shown. The intake cam follower 2 engages the intake valve cam 3 and the exhaust cam follower 4 engages the exhaust valve cam 5. The cam followers 2 and 4 transmit the cam action through pushrods 6 and 7 to the rocker arms and engine valves. The cam followers are contained and guided in the follower bracket 8. A removable side cover 9 permits access to the follower bracket 8 for maintenance purposes.

It is noted that the cam shaft extends in the left hand direction to form an exhaust cam 10 and intake cam 11 which in turn operate cam followers 12 and 13, respectively. The cam follower 12 drives the pushrod 14 while the cam follower 13 drives the pushrod 15. To generate the retarding action of the engine a special cam 16 and a special cam 17 is provided on the cam shaft 1 for each pair of intake and exhaust valves. For the purpose of illustration, the exhaust followers are fitted with a special hydraulic actuator for opening of the exhaust valve earlier. It is understood that either the exhaust valve or the intake valve might be used to open the combustion chamber near the end of the compression stroke. The cam 17 acts on the hydraulic pump 18. The hydraulic pump 18 is fitted into the follower bracket 8. The hydraulic pump 18 includes the follower sleeve 19 forming an orifice 20 in communication with the spring chamber 21 formed inside sleeve 19. The spring chamber contains a spring 22 compressively positioned inside the spring chamber on the seat 23 and engaging the base 24 of the fluid displacer piston 25. The displacer piston 25 is fitted into the follower sleeve 19 and extends upwardly into a slot 26 in the adjusting plug 27. The fluid displacer piston 25 defines an axial passage 28 connected to the cross passage 29.

Transverse passage 30 is formed transversely in the follower bracket 8 and connects to an annular recess 31. The annular recess is in communication with the inlet ports 32 when the follower sleeve 19 is on the base circle of the cam 17.

The pressurizing chamber 33 is in communication with the actuator chamber 34 through the connecting passage 35. The actuator chamber 34 is connected to the cross passage 35 through the radial ports 36 in the exhaust valve follower sleeve 37. The exhaust valve follower sleeve forms a hydraulic actuator with the plunger 38. Plunger 38 operates the pushrod 14 to open exhaust valve. The plunger 38 includes the lower section 39 which defines the actuator chamber 34. The exhaust valve follower 37 also is fitted with an insert 40 which with the exhaust valve follower sleeve 37 forms the lower portion of the actuator chamber 34.

Referring to FIGS. 3, 4, 5 and 6 the supply passages are illustrated. The pump 45 may be an auxiliary hydraulic fluid pump or the lubrication oil pump. The pump receives fluid from the oil reservoir 46 and pressurizes fluid in the hydraulic line 47. The hydraulic line 47 is connected to the supply passage 48. The supply passage 48 is connected to the hydraulic valve 49 which is connected to the passage 50 in the side cover 9. The sleeve 51 connects side panel 9 to the follower bracket 8 providing communication between distribution passage 52 in the follower bracket 8 to the passage 50 in the panel 9. The distribution passage 52 extends through the follower bracket 8 and connects to the transverse passages 30 to the hydraulic pumps formed in the follower sleeve 19 of the auxiliary pumps.

The hydraulic valve 49 may be operated by a solenoid control 53 as shown in FIG. 5. A modification is shown in phantom in FIG. 3 wherein the hydraulic valve operator 54 shows hydraulic means for operating the valve 49. The means of operation of valve 49 is not of primary importance. However, the operation of this valve should be controlled from the operator station in the vehicle. The control for operating the valve should simultaneously cut off the fuel passage to the engine. When the fuel supply is cut off and the hydraulic valve 49 is opened to connect the lubricating oil system 55 to the hydraulic pump 18 the engine then operates as an air compressor.

A check valve 60 is positioned in the follower bracket 8. The check valve includes the plunger 61, spring 63, spring seat 101 and snapring 102. The passage 62 connects the pressurizing chamber 33 to the check valve 60. Normally, the underside of the plunger 61 in check valve 60 is exposed to the pressure of the distribution passage 52. This biases the plunger 61 to close passage 62 from the pressurizing chamber 33. When pressure is present in the distribution passage 52, the check valve 60 is closed and the pressurizing chamber 33 operates to open the exhaust valve.

When the pressure in the distribution passage 52 is released, the spring 63 biases the plunger 61 downwardly thereby opening the passage 62 releasing pressurized fluid from the chamber 33. In this manner, when the retarding device is shut off by means of the control 53 and the hydraulic valve 49 is closed pressure is released immediately from the chamber 33 and the retarder becomes inoperative.

Referring to FIG. 7 the engine 70 is shown. The crankshaft 71 provides the motive force from the engine for driving the vehicle. The crankshaft 71 is connected by plurality of connecting rods 72 to a plurality of pistons 73. The cam shaft 1 is driven by the engine and operates the plurality of pushrods as previously described. The pushrod 14 operates through the rocker arm 76 to operate the valve 77. The valve 77 is normally biased to a closed position by the spring 78. When the valve 77 is opened in response to the retarding device the compressed air in the combustion chamber 79 is released through the intake passage. The engine brake operates on either a two or four cycle engine and may be used in combination with a gasoline engine or a diesel engine.

The operation of the device will be described in the following paragraphs.

When the operator activates the engine retarder, he initiates an electrical or hydraulic control signal to the shutoff valve 49. When the valve is opened by the control signal, it admits lubrication oil under pressure through the passage 50 and through the sleeve 51 to the distribution passage 52 in the follower bracket. Lubrication oil flows through the transverse passage 30 to the annular recess 31 and the inlet ports 32. This admits hydraulic fluid to the interior of the pump 18. From there the lubricating oil flows through the axial passage 28 and the radial passages 29 to the pumping chamber surrounding the fluid displacer piston 25, and into the interior of the exhaust valve follower through the passage 35 and the radial ports 36.

The retarder cam 17 is arranged in such a way as to start its lift during the engine compression stroke. Initial movement of the follower sleeve 19 causes the lower edge of the inlet ports 32 to override the upper edge of the annular recess 24. During this movement, lubricating oil is displaced from the pressurizing chamber 33 and through the radial passages 29 out of the hydraulic pump through the orifice 20. Further upward movement of the follower sleeve 19 causes its upper edge to override the upper edge of the radial passages 29 of displacer piston 25. Closing of the radial passages forces the remaining trapped lubricating oil to raise the hydraulic plunger 38. Cam lobe 18 is dimensioned in such a way as to start the rise of the hydraulic plunger 38 and through it the engine exhaust valve near the end of the compression stroke. The upward movement of the hydraulic plunger 38 continues until the sleeve follower 19 comes to the top of the nose of cam 17. Subsequently, on the downward side of the cam 17 the follower sleeve begins its return movement which is caused by the return force of the valve spring transmitted through the pushrod 14 to the hydraulic plunger 38 and aided by the force of the return spring 22 contained in the inside of the follower sleeve 19. The exhaust valve is reseated by the time this downward movement uncovers the radial ports 32 in the fluid displacer piston 25. This is timed to occur in the first portion of the engine expansion stroke. Near the bottom of the expansion stroke the exhaust valve cam lifts the exhaust valve cam follower sleeve 37 and the rest of the engine cycle follows in a normal manner.

When the operator desires to remove the retarding action of this device, he deactivates the shutoff valve 49 which interrupts the supply of pressurized lubricating oil to the hydraulic pump 18. During the next cycle following the interruption of the lubricating oil supply, the exhaust valve follower accelerating and decelerating during the normal actuation of the exhaust valve forces the rest of the lubricating oil contained in the interior to spill through the ports 32 and bleed hole 20 to the outside of the hydraulic pump. The pumping chamber will now be empty and without a fresh supply of lubricating oil the next lift of the retarder cam 17 will not be able to reopen the exhaust valve.

In order to assure a positive and instantaneous cutout of the retarding action, a check valve 60 is positioned in the immediate vicinity of the hydraulic pump 18. The lower face of this valve is exposed to the distribution lubrication oil passage 52. The cross passage 62 connects the space above the check valve plunger 61 to the interior of the pumping chamber and when the retarder action is initiated the passage 52 is filled with lubricating oil under pressure. This pressure overcomes the force of the check valve spring 63 lifting the valve against the seat 101. This movement overrides the passage 62 closing it off as long as the retarder action is maintained.

When the actuating signal is removed from the shutoff valve 49, lubricating oil pressure in the distribution oil passage 52 drops to the ambient pressure and the spring 63 forces the plunger 61 downward. Passage 62 now connects the pumping chamber 33 to the outside preventing any further pressure build-up over the hydraulic plunger 38 and thus eliminating the possibility of its movement relative to the follower sleeve 37.

Rotating threaded plug 27 moves the fluid displacer piston 25 up or down which in turn varies the amount of hydraulic pump lift to port closing. This allows to adjust the exhaust valve lift during retarder action and to optimize its effectiveness. Once the required adjustment has been made, a shim 105 is placed over the head of adjusting plug 27. Tightening of the screw 80 prevents rotation of the plug 27 when in service.

The embodiments of the invention in which an exclusive property or privilege is claimed are defined as follows:

1. In an internal combustion engine having means for operating the engine as an engine brake comprising, a cam shaft comprising an exhaust valve cam and an auxiliary cam angularly spaced on said cam shaft, means defining a combustion chamber, a valve in said combustion chamber, a valve operating mechanism between said exhaust valve cam on said cam shaft and said valve for normally operating said valve in response to rotation of said cam shaft when said engine is operating as an engine, a hydraulic actuator in said mechanism defining a hydraulic actuator chamber, a hydraulic pump defining a pumping chamber connected to said actuator chamber in said hydraulic actuator for expanding said hydraulic actuator and operating said valve in said combustion chamber, said auxiliary cam on said cam shaft driving said pump and providing early opening of said exhaust valve, a hydraulic system having a source of pressurized fluid selectively connected to said pump for supplying hydraulic fluid to said pump, control valve means selectively connecting said hydraulic system to said pump and supplying fluid to said pump for operating said valve in said combustion chamber as said hydraulic actuator is expanded to thereby operate said engine as an engine brake.

2. An internal combustion engine having means for operating the engine as an engine brake as set forth in claim 1 wherein said hydraulic system includes a lubricating oil system in said engine.

3. An internal combustion engine having means for operating the engine as an engine brake as set forth in claim 1 including a pressure release valve, means connecting said hydraulic system to normally close said pressure release valve in response to pressure in said hydraulic system when said pump is in operation, a relief passage connected between said pumping chamber of said pump and said pressure release valve to selectively release pressure from said pumping chamber, said release valve thereby retaining pressure in said pumping chamber when said pressure release valve is closed and releases pressure from said pumping chamber when said pressure release valve is open.

4. An internal combustion engine operating as an engine brake as set forth in claim 1 wherein said valve in said combustion chamber comprises an exhaust valve on said engine.

5. An internal combustion engine having means for operating the engine as an engine brake as set forth in claim 1 including a cam follower sleeve operated by said auxiliary cam means, an adjustable displacer piston received in said follower sleeve for calibrating the timing for initiating and terminating operation of said hydraulic pump for opening and closing said valve in the combustion chamber.

6. An internal combustion engine for operating an engine as an engine brake as set forth in claim 1 wherein said hydraulic pump includes a cam follower sleeve defining an orifice forming a drain passage from said pump when pressure is released from said hydraulic system.

7. An internal combustion engine having means for operating as an engine brake as set forth in claim 1 including a pressure release valve, means defining a chamber in said pressure release valve connected to said hydraulic system for biasing said valve to a closed position, vent passage means connecting said pumping chamber of said hydraulic pump through said pressure release valve to thereby relieve pressure in the pumping chamber of said hydraulic pump when the system pressure is relieved from said pressure release valve.

8. An internal combustion engine having means for operating the engine as an engine brake as set forth in claim 1 including an auxiliary cam on said cam shaft, an adjustable displacer piston in said hydraulic pump to calibrate the initiation of the pumping cycle for opening said valve in said combustion chamber.

9. An internal combustion engine having means for operating the engine as an engine brake as set forth in claim 1 including electrical means for opening said control valve for supplying pressurized fluid from said hydraulic system to said hydraulic pump to thereby initiate operation of said engine brake.

10. An internal combustion engine having means for operating the engine as an engine brake as set forth in claim 1 including hydraulic means for operating said control valve to connect said hydraulic system to said hydraulic pump for initiating operation of said engine brake.

* * * * *